US008527404B2

(12) United States Patent
Sellen et al.

(10) Patent No.: US 8,527,404 B2
(45) Date of Patent: Sep. 3, 2013

(54) MERCHANT-INITIATED ADJUSTMENTS

(75) Inventors: Kerry A. Sellen, Kemah, TX (US); Christopher A. Schmid, Houston, TX (US)

(73) Assignee: First Data Corporation, Greenwood Village, CO (US)

( * ) Notice: Subject to any disclaimer, the term of this patent is extended or adjusted under 35 U.S.C. 154(b) by 1376 days.

(21) Appl. No.: 12/024,536

(22) Filed: Feb. 1, 2008

(65) Prior Publication Data
US 2009/0024527 A1   Jan. 22, 2009

Related U.S. Application Data

(60) Provisional application No. 60/950,662, filed on Jul. 19, 2007.

(51) Int. Cl.
*G06Q 40/00* (2012.01)

(52) U.S. Cl.
USPC .................................. 705/39; 705/35; 705/45

(58) Field of Classification Search
None
See application file for complete search history.

(56) References Cited

U.S. PATENT DOCUMENTS

| | | | |
|---|---|---|---|
| 5,484,988 A * | 1/1996 | Hills et al. | 235/379 |
| 6,557,007 B1 * | 4/2003 | Pekowski et al. | 705/37 |
| 7,428,988 B1 * | 9/2008 | Starr | 235/383 |
| 7,496,536 B2 * | 2/2009 | Lasater et al. | 705/38 |
| 7,540,410 B2 * | 6/2009 | Templeton et al. | 235/380 |
| 7,890,433 B2 * | 2/2011 | Singhal | 705/64 |
| 2002/0032625 A1 | 3/2002 | Brown | |
| 2006/0122947 A1 | 6/2006 | Poulin | |
| 2006/0212391 A1 | 9/2006 | Norman et al. | |
| 2006/0235776 A1 | 10/2006 | Temme | |
| 2007/0112647 A1 * | 5/2007 | Borders et al. | 705/27 |
| 2007/0267479 A1 * | 11/2007 | Nix et al. | 235/379 |

FOREIGN PATENT DOCUMENTS

EP          0525946 B1      8/2001

OTHER PUBLICATIONS

Mycoupons.com, Nov. 8, 2005, available at http://www.mycoupons.com/boards/auction-talk/723421-anyone-refund-uncleared-echeck.html.*
PCT International Search Report and Written Opinion mailed Oct. 20, 2008, International Application No. PCT/US08/70476, 12 pages.

* cited by examiner

*Primary Examiner* — Asfand Sheikh
*Assistant Examiner* — Allen Chein
(74) *Attorney, Agent, or Firm* — Kilpatrick Townsend & Stockton LLP

(57) ABSTRACT

Tools for adjusting a debit transaction, which can allow a payee to adjust the amount of the transaction without having to provide cash back to the payor. Instead, the refund amount may be applied as a credit against the debit transaction. In an aspect, the credit may be for any amount up to the original amount of the check (less any credit already applied). Optionally, one or more security and/or anti-fraud measures may be implemented, e.g., ensuring that the check is not subject to a collection proceeding and/or ensuring that the requested credit is not more than the amount of the check itself).

19 Claims, 4 Drawing Sheets

MERCHANT-INITIATED ADJUSTMENTS

CROSS-REFERENCE TO RELATED APPLICATIONS

This application is a nonprovisional application claiming, under 35 U.S.C. §119(e), the benefit of the filing date of provisional U.S. Patent Application No. 60/950,662, entitled "Merchant-Initiated Adjustments" and filed Jul. 19, 2007 by Sellen et al., the entire disclosure of which is hereby incorporated by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to processing financial transactions, and more particularly, to tools for adjusting a debit transaction by processing a credit against the transaction.

BACKGROUND

Presentation instruments, such as personal checks, business checks, and the like, have long been used as payment instruments when transacting business. Merely by way of example, if a customer wishes to purchase merchandise from a merchant, and the customer does not wish to use cash, the customer might elect to pay for the merchandise by personal check, business check, and/or the like.

While somewhat convenient, the use of such presentation instruments does have limitations. For example, if the merchant elects to refund some of the paid monies, the merchant usually must provide the refund in cash (or other funds), since there is currently no way for the merchant to "un-wind" a presentation instrument transaction, once the instrument has been processed and/or negotiated. (Of course, the customer could request that the customer's financial institution stop payment on the check, but that process is lengthy and generally is too burdensome merely to facilitate a refund. Moreover, if the check has already been paid, it may be to late for a stop payment order to be effective.)

Moreover, the characteristics of a presentation instrument transaction render the transaction vulnerable to various types of fraud. For example, a customer can purchase merchandise with a bad check (e.g., a check drawn on an account with non-sufficient funds, etc.) and then return the merchandise for a cash refund, putting the merchant (and/or a financial intermediary, such as a check processor) at risk of being unable to clear the check, while the customer walks away with the cash.

Thus, there is a need for a more robust method of adjusting payment instrument transactions.

BRIEF SUMMARY

In one aspect, embodiments of the invention provide tools for adjusting a debit transaction (such as, for example, a transaction in which a user pays for goods and/or services using a personal or business check). Advantageously, such tools can allow a merchant to refund some or all of the purchase price without having to provide cash back to the customer. Instead, in accordance with some embodiments, the refund amount can be applied as a credit against the debit transaction. These features can provide enhanced security and fraud protection for the merchant, as well as enhanced convenience for the customer.

Merely by way of example, in accordance with one set of embodiments, after a check transaction has been processed, a merchant can request (for example, via a point of entry device) that a processor adjust a debit transaction by applying a credit against the transaction. In an aspect, the credit may be for any amount up to the original amount of the check (less any credit already applied). The processor, then, might process (e.g., via an automated clearinghouse, etc.) a credit toward the customer's account and/or a corresponding debit against the merchant's account. Optionally, one or more security and/or anti-fraud measures may be implemented (e.g., ensuring that the check is not subject to a collection proceeding and/or ensuring that the requested credit is not more than the amount of the check itself).

The tools provided by various embodiments of the invention include, without limitation, methods, systems, and/or software products. Merely by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like). In a particular embodiment, the set of instructions might be incorporated within an enterprise application and/or might be provided as a separate computer program that can be used to configure the enterprise application.

A method, in accordance with one set of embodiments, of adjusting a debit transaction between a merchant and a customer comprises processing, with a computer system, a debit transaction between the customer and the merchant. The debit transaction, in an aspect, might have a debit amount payable from a deposit account held by the customer. In some embodiments, the method further comprises creating a transaction record, which corresponds to the debit transaction and comprises a first value corresponding to the debit amount.

The method might further comprise receiving, perhaps at the computer system and/or from a merchant device (e.g., a point of entry device, etc.), a request from the merchant to adjust the debit transaction by a credit amount, which represents a credit against the debit transaction. The transaction record may be identified at the computer system and/or updated, in response to the request. Merely by way of example, updating the transaction record might comprise, inter alia, reducing, by the credit amount, the value of the variable corresponding to the debit amount, such that the variable has an updated value corresponding to the difference between the debit amount and the credit amount. In some cases, the method comprises transmitting a confirmation message for reception by the point of entry device. In an aspect, the confirmation message might indicate to the merchant that the request has been received (e.g., the request might be evaluated and/or processed at a later time). In another aspect, the confirmation message might indicate that the requested adjustment has been performed, and/or that the request has been denied.

In an aspect, the debit transaction might debit a customer account (which may be, but need not necessarily be, associated with the financial instrument) and/or credit a merchant account associated with the merchant. In some cases, the method includes searching a database for a collection record corresponding to the debit transaction. The collection record would indicate that the debit amount has not been collected from the first account. Upon determining that a collection record corresponds to the debit transaction, the method might comprise denying the request, such that updating the transaction record comprises updating the transaction record to indicate that an adjustment request has been denied, and/or transmitting a confirmation message comprises transmitting a denial message. Alternatively, if a collection record exists, the adjustment transaction might simply apply a credit against the collection record. Conversely, upon determining that no collection record corresponds to the debit transaction, the transaction might be approved (perhaps subject to other factors), such that updating the transaction record comprises reducing the value of the variable by the credit amount, such that the variable has an updated value corresponding to the difference between the debit amount and the credit amount, and/or the confirmation message might confirm that the debit transaction has been adjusted.

In another aspect, the method might comprise comparing the adjustment request with the transaction record to determine whether the credit amount is greater than the amount of the original debit transaction (perhaps after subtracting any intervening credits). Upon determining that the credit amount is greater than the debit amount, the adjustment might be denied. Alternatively, if the credit amount is greater than the debit amount, the method might comprise obtaining additional funds from the merchant (e.g., by debiting the merchant account) and applying an additional credit to the customer account. Conversely, upon determining that the credit amount is less than the debit amount, the adjustment might be approved.

In some embodiments, the process can be repeated for a second requested adjustment. In this case, the request might be compared with an updated transaction record, to determine whether the credit amount of the second adjustment is greater than an updated value of the variable (which might correspond to the original debit amount less any prior adjustments).

Another set of embodiments provides systems for adjusting debit transactions. An exemplary computer system, for instance, might comprise a processor, a communication interface in communication with the processor, a database in communication with the processor, and/or a computer readable medium in communication with the processor. The computer readable medium might have encoded thereon a computer program comprising a set of instructions executable by the processor to cause the computer system to perform one or more operations, including without limitation, operations in accordance with methods of the invention.

Merely by way of example, the set of instructions might include, without limitation, instructions for processing a debit transaction between the customer and the merchant and/or instructions for creating, in the database, a transaction record corresponding to the debit transaction, the transaction record comprising a first value corresponding to the debit amount. In some cases, the set of instructions further comprises instructions for receiving, e.g., from a point of entry device, a request from the merchant to adjust the debit transaction by a credit amount representing a credit against the debit transaction. The set of instructions might further comprise instructions for identifying the transaction record at the computer system, instructions for updating the transaction record and/or instructions for transmitting a confirmation message for reception by the point of entry device.

In some embodiments, the system further comprises one or more point of entry devices. A typical point of entry device might comprise a processor, a communication interface in communication with the processor, and or a computer readable medium having encoded thereon a first computer program comprising a first set of instructions executable by the first processor to cause the first point of entry device to perform one or more operations.

The set of instructions on the point of entry device's medium might comprise, inter alia, instructions for receiving, from a merchant, a request to adjust a debit transaction by a credit amount representing a credit against the debit transaction, instructions for transmitting the request for reception by a host computer system, and/or instructions for displaying confirmation of a status of the request, based on receipt of a confirmation message from the host computer system.

Yet another set of embodiments provides computer programs, including without limitation computer programs that can be used to configure a host computer and/or a point of entry device. An exemplary embodiments, for instance, comprises a computer readable medium having encoded thereon a computer program comprising a set of instructions that are executable by a computer system to perform one or more operations, including without limitation operations in accordance with methods of the invention.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

Figure 1:
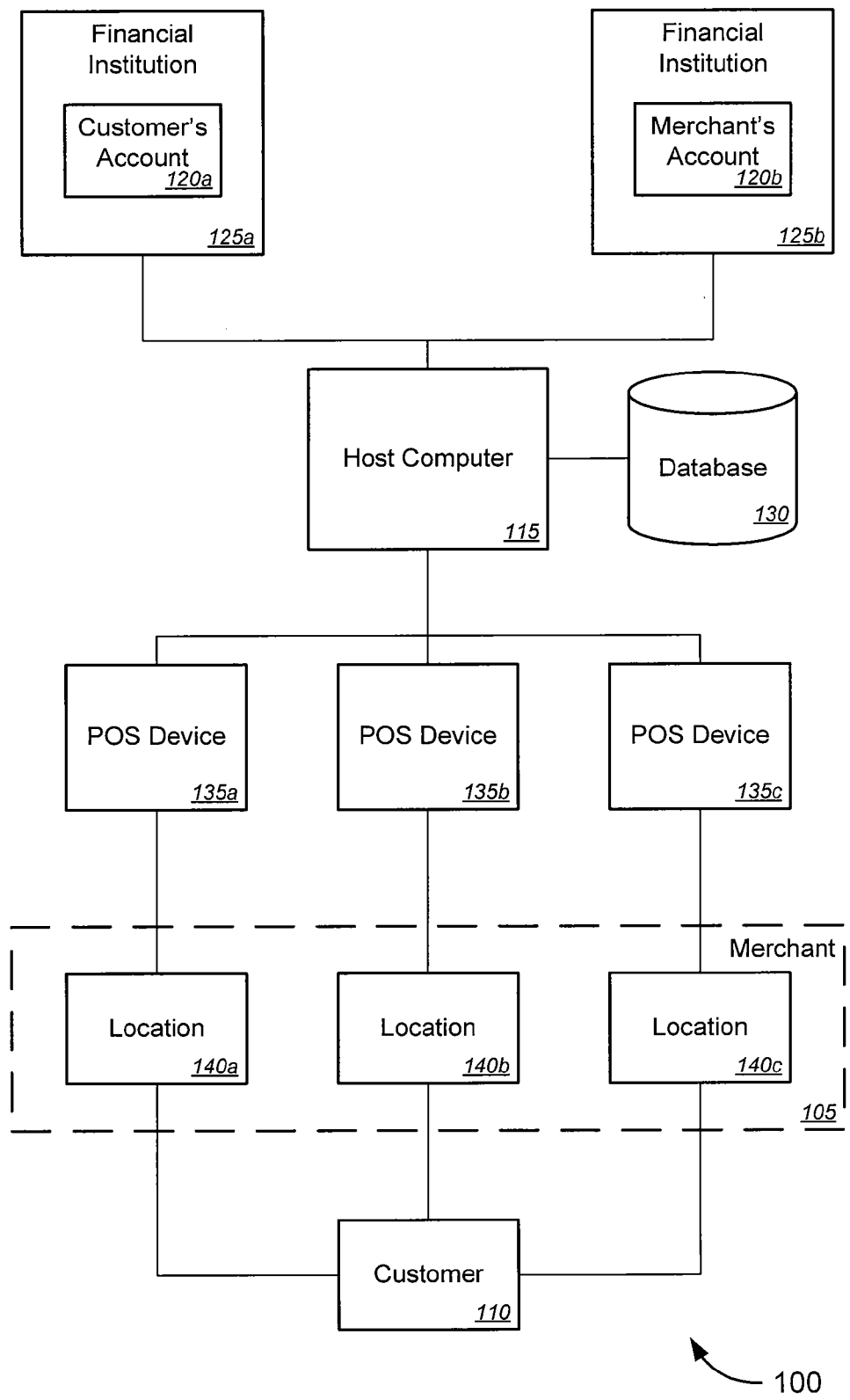
FIG. 1 is a block diagram illustrating a system for processing a financial transaction, in accordance with various embodiments of the invention.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiments as well. By the same token, however, no single feature or features of any described embodiment should be considered essential to the invention, as other embodiments of the invention may omit such features.

In one aspect, embodiments of the invention give a transaction processing company a facility for adjusting a debit transaction (such as for example, a transaction in which a user pays for goods and/or services using a presentation instrument, such as a personal or business check), in response to a request from a merchant. Advantageously, using such embodiments of the invention, the merchant has the ability to refund some or all of the purchase price without having to provide cash back to the customer, because the refund amount can be applied as a credit against the debit transaction. For instance, after a check transaction has been processed, a merchant can request (for example, via a point of entry device, by telephone, etc.) adjustment of a debit transaction (e.g., by applying a credit against the transaction).

In some cases, the adjustment process of the invention provides a full credit against the debit transaction (i.e., a credit in the amount of the original check). In other embodiments, the merchant can request a credit in any amount up to the original amount of the check (less any credit already applied) and/or or can request a credit that is greater than the amount of the original check. The processor, then, might process (e.g., via an automated clearinghouse, etc.) a credit toward the customer's account and/or a corresponding debit against the merchant's account. In one aspect, the tools of the invention provide a transaction record that tracks the amount of the original debit (e.g., check), along with any credits previously applied, to effectively maintain a running balance of the debit transaction.

In an aspect, some embodiments of the invention can provide enhanced security and/or fraud protection for the merchant and/or check processor, as well as enhanced convenience for the customer. Merely by way of example, one embodiment is configured to avoid providing a credit in excess of the original debit amount. In a particular embodiments, as noted above, a running total of the debit amount is maintained; this can allow the customer to request multiple credits while still preventing the total credit amount from exceeding the original debit amount. For example, if a customer purchases a shirt, a jacket, and a pair of pants from a merchant, and pays for all of the items with a single check, the customer might want to return the shirt on one day for a partial refund of the check amount, and return the pants the next day, for another partial refund. Embodiments of the invention can be configured to ensure that the partial refunds, collectively, do not exceed the amount of the original check, although, as described in further detail below, this is not always the case.

Another aspect of the invention allows the processor to ensure that the customer's check is valid and funded before providing any refund credit. For instance, as noted above, one common fraud scheme is to write a check for merchandise, stop payment on the check (or fail to maintain a sufficient account balance to fund the check), and then return the merchandise for a cash refund, defrauding the merchant and/or the check processor. Certain embodiments can prevent this type of fraud (as well provide other benefits) by determining whether the check is subject to collection proceedings prior to processing the credit request.

Another feature provided by certain embodiments is the ability to support multiple locations. Hence, if a customer pays for merchandise (e.g., by check) at a first merchant location (that has, for example, a first point of entry ("POE") device), the customer can return some of the merchandise to a second location (having a second POE device) to receive a partial refund, and return other of the merchandise to a third location (having a third POE device) to receive another partial refund. This feature beneficially provides enhanced convenience for the customer and the merchant, while (optionally) still providing the security benefits described above.

FIG. 1 illustrates an exemplary system 100 for adjusting a debit transaction. (Hereinafter, a debit transaction is frequently referred to as a "check transaction," and the financial instrument used for the transaction is often referred to as a "check," although one skilled in the art will appreciate that other types of transactions, including transactions employing other types of financial instruments, can be supported using various embodiments of the invention. In fact, in some embodiments, the transaction might not even involve a physical check; rather, the transaction might comprise a web-based transaction, a telephone transaction, a point of sale transaction, a corporate credit or debit ("CCD") transaction (also known as a cash concentration or disbursement transaction), a prearranged payment and deposit ("PPD") transaction, an accounts receivable check conversion ("ARC" or "Lockbox") transaction, a point of sale (e.g., personal identification ("PIN") based) transaction, and and/or the like. In an aspect, any type of transaction involving a payment vehicle based on a deposit account can be supported.) It should be noted that, for descriptive purposes, the illustrated system 100 includes various elements (such as a customer, merchant, and associated financial institutions, to name a few examples) that may not be included in various embodiments of the invention.

In a general sense, the system 100 can be used to adjust a check transaction between a merchant 105 and a customer 110. (The terms "merchant" and "customer" are used herein for descriptive purposes only and are not intended to be limiting; hence, those terms should be interpreted broadly to mean any type of payee and payor, respectively, in a debit transaction.) One example of such a transaction is when the customer 110 purchases goods and/or or services (sometimes referred to generally herein as "merchandise") from the merchant 105 and pays for the goods or services using a personal check, business check, and/or the like. Later, the merchant 105 might wish to change the monetary amount of the transaction (for example, if the customer 110 were to return some or all of the merchandise for a full or partial refund, if the merchant 105 wanted to retroactively apply a discount, or for any other reason). The tools of the invention would allow the merchant 105 to adjust the transaction without having to directly reimburse the customer 110 from the merchant's cash stores.

One skilled in the art will appreciate that a financial intermediary (referred to herein as a "check processor") often will process and/or facilitate a check transaction. Processing a check transaction can include a variety of services, including, without limitation, verifying the legitimacy of an account 120a on which the check is drawn, ensuring that other checks drawn on that account 120a and/or presented by the customer 110 are not subject to collection, and/or the like. Processing the check transaction might also include (but need not necessarily include) negotiating the check on behalf of the merchant and/or the merchant's bank 125b (using, for example, an automated clearinghouse ("ACH") or the like).

In an embodiment, the check processor will operate a host computer 115, which can be any computer system (including, but not limited to, a system of multiple computers) that is capable of processing financial transactions and/or communicating with appropriate entities (including, without limitation, various financial institutions 125, an ACH, etc.). In many cases, the host computer 115 will comprise and/or be in communication with one or more databases (illustrated generally by database 130) for storing information related to transactions processed by the host computer. Exemplary arrangements of the host computer 115 and database 130 are described in further detail below with respect to FIGS. 3 and 4.

In a typical check transaction, the customer 110 presents a check (or other financial instrument) to the merchant 105 for payment. The merchant 105 submits a request to the host computer 115 for processing of the check, and thereafter, the check is processed via any of a variety of conventional techniques. Merely by way of example, in one scenario, the host computer 115 confirms to the merchant that the check is drawn on a valid account and otherwise appears legitimate. The merchant 105 then accepts the check as payment for the merchandise. Thereafter, the merchant's financial institution 125b and/or the processor 115 negotiates the check with the customer's financial institution 125a, using an ACH or some other facility, with the end result being funds (in an amount typically specified on the face of the check) taken out of (debited from) the customer's account 120a and placed in (credited to) the merchant's account 120b. (As illustrated the customer 110 and the merchant 105 might maintain accounts 120a, 120b, respectively, a different financial institutions 125a, 125b, respectively. Alternatively, the customer 110 and merchant 105 coincidentally might maintain accounts at the same financial institution; this distinction is immaterial to the invention).

Typically, but not always, financial institutions 125 also will operate host computers (not shown), which might be in communication with the host computer 115. In a set of embodiments, however, the check processor might instead be one of the institutions 125. For example, the merchant's financial institution 125b might perform check processing services in addition to serving as a depository institution, and in such cases the host computer 115 might be operated by the merchant's financial institution 125b and/or might directly handle transactions involving the merchant's account 120b.

Typically, a POE device 135 serves as an interface between the merchant 105 and the check processor (or, more specifically, the host computer 115 operated by the check processor). A POE device 135 can be any type of device that provides data communication with a host computer 115. Often, a POE device 135 will be a specialized terminal, such as a typical point of sale ("POS") device (such as the Eclipse® terminal, available from First Data Corp., to name but one example) having specified hardware (including communication hardware for communicating with the host, hardware for reading and/or scanning one or more types of financial instruments, and/or hardware to allow an operator to hand-key information, such as MICR information found on a financial instrument) and/or will be incorporated with a cash register. POE devices 135 can also include mobile communication devices (including without limitation mobile phones, personal digital assistants, and/or the like), personal computers (e.g., via a dedicated client application configured to interface with the host computer 115, via a web browser, and/or the like) and/or any other type of device that can be configured for communication with a host computer 115, which may include (but need not necessarily include) specialized input hardware for reading and/or scanning financial instruments. Hardware configurations of exemplary POE devices are described in further detail below with respect to FIGS. 3 and 4.

Conventionally, once a check had been processed and/or negotiated, the transaction is final. Hence, if the merchant 105 wanted to change the amount of the check transaction (for example, if the customer 110 returned some or all of the merchandise for a refund), the merchant would have to provide cash (or some other type of funds, such as a business check) as the refund. As noted above, this procedure is both inconvenient and a potential source of fraud.

By contrast, in accordance with embodiments of the invention, if the merchant 105 wishes to provide a credit to the customer 110, the merchant 105 can instead request an adjustment to the check transaction itself. As noted above, this process provides both enhanced convenience for the merchant and customer, as well as reduced risk of fraud. In one set of embodiments, the merchant requests (via a POE device 135, for example) an adjustment to the check transaction, and the host computer 115 performs the necessary procedures to apply a credit (in the amount of the requested adjustment) to the original check transaction, for example by processing respective credits and debits to the respective accounts 120a, 120b.

In a set of embodiments, the invention can support transactions from a number of POE devices 135. Consider, for example, a typical situation in which a merchant 105 (perhaps a retailer) has a number of different locations 140. Each location 140a, 140b, 140c has a POE device 135a, 135b, 135c, respectively. If customer 110 purchases merchandise at a first location 140a and wishes to pay by check (or some other financial instrument), that check transaction is communicated to the host computer 115 (for processing) via a first POE device 135a. (In some cases, the transaction can be consummated, e.g., via any of a variety of electronic settlement procedures, based on the communication from the POE; in other cases, the merchant 105 might deposit the check in the merchant's account 120b to actually consummate the transaction.) If the customer later wants to return some of the merchandise to a different location 140b, and the merchant elects to request an adjustment, a different POE device 135b is used to make the request. Similarly, if the customer wants to return yet more merchandise to a third location 140c, a third POE device 135c is used for communication with the host computer 115. Hence, in accordance with certain embodiments of the invention, neither the customer nor the merchant is limited with respect to the location at which merchandise is to be returned (or adjustments requested).

Figure 2:
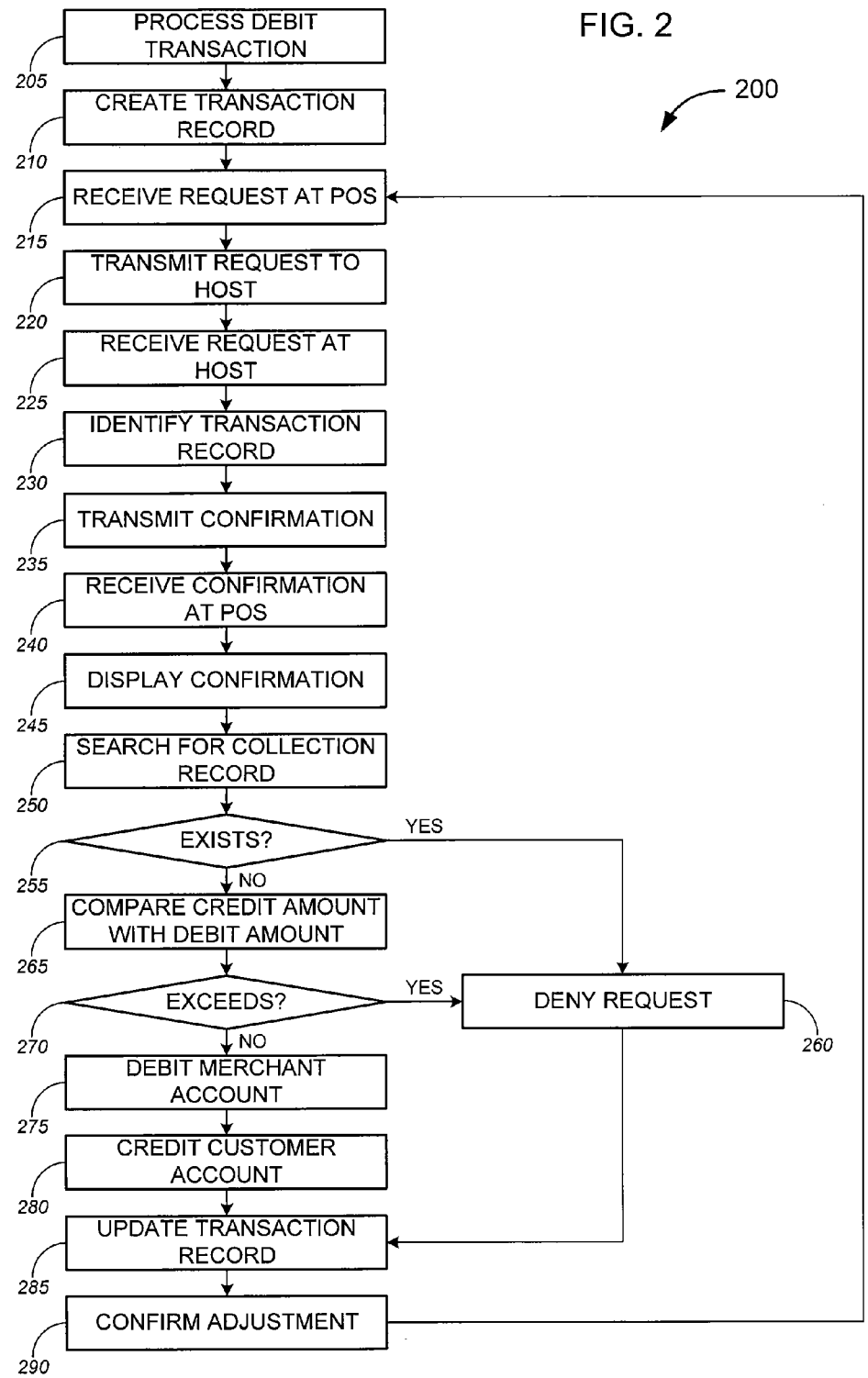
FIG. 2 is a process flow diagram illustrating a method of adjusting a financial transaction, in accordance with various embodiments of the invention

FIG. 2 illustrates a method 200 of adjusting a financial transaction, in accordance with one set of embodiments. In some cases, the method 200 can be implemented by a system, such as the system 100 described above. It should be appreciated, however, that the system 100 of FIG. 1 may operate in a manner different than the method of FIG. 2; likewise, it should be understood that the method 200 of FIG. 2 may be implemented using any type of system and therefore is not limited to implementation in the system 100 of FIG. 1 (or any particular structural arrangement, for that matter).

In some embodiments, the method 200 comprises processing a debit transaction (block 205). The debit transaction, in an aspect, pertains to a presentation instrument (such as a business check, a personal check, etc.) that is payable in a certain amount (sometimes referred to herein as a "debit amount"). As noted above, the transaction debits a first account (e.g., a customer's account) associated with the presentation instrument and credits a second account (e.g., a merchant's account) maintained by the payee of the presentation instrument.

As noted above, processing a debit transaction (e.g., a check transaction) can comprise any of a variety of operations. In particular embodiments, a host computer processes a check transaction by performing any operation that facilitates the approval, negotiation and/or completion of a transaction. As part of processing the debit transaction, the host computer, in some embodiments, creates a transaction record (block 210) corresponding to the transaction. The transaction record, in an aspect, may be stored in a database maintained by the host computer. In another aspect, the transaction record comprises a plurality of fields and/or variables, which contain values (data) pertaining to the check transaction. Such values can include, without limitation, check number, account number and/or routing number of the account/financial institution on which the check is drawn, and/or the like.

The transaction record might also include a field comprising a transaction identifier. The transaction identifier can be used to identify the transaction within the host computer and/or may be provided to the merchant to facilitate later identification of the transaction. In particular embodiments, the transaction record includes a variable with a value corresponding to the amount of the debit transaction (i.e., the payable amount on the face of the check). As noted below, this value can be used to evaluate adjustment requests.

At block 215, an adjustment request from the merchant is received at a POE device. Merely by way of example, in some embodiments, the merchant (or, more specifically, an employee of the merchant) might input such a request into the POE device, using a keypad or other input device. In some cases, the request includes identifying information that is sufficient to identify the check transaction to be adjusted. Such information can include a transaction identifier, a routing/account number pair, a check number, and/or the like. The request also generally will include an identification of an amount of credit to be applied by the adjustment (either in absolute terms, such as a dollar value, or in relative terms, such as a specified proportion of the original check transaction amount).

The POE device transmits (for reception by the host computer) a request to adjust the debit transaction (block 220). The request transmitted from the POE device might include some or all of the information input by the merchant (and/or similar types of information). Hence, the request transmitted from the POE device generally will include a credit amount by which the transaction should be adjusted, as well as sufficient information to identify the transaction to be adjusted.

There are a variety of facilities known in the art for providing communication between a POE device and a host computer (some of which are described in detail below), and any of such facilities can be used in accordance with various embodiments. In an aspect, the request comprises a message including the relevant details (e.g., an identifier, such as a check number, transaction number, and/or the like; an amount of credit to be applied; and any other pertinent details, which can vary depending on various implementations).

The host computer is configured to receive the request from the POE (block 225). Upon receiving the request, the host computer identifies a transaction record corresponding to the original debit transaction (block 230), based at least in part on the adjustment request. Merely by way of example, as noted above, the adjustment request often comprises some type of identifier (such as a check number, transaction number, etc.) corresponding to the original debit transaction. This identifier (and/or a check number, account number, and/or routing number, etc.) can be used as a search key to search the database for the transaction record corresponding to the original debit transaction.

At block 235, the host computer transmits a confirmation message for receipt by the POE device from which the adjustment request was received. In some embodiments, the adjustment request may not be evaluated and/or processed in real time, but instead as a back-end process. In such embodiments, the merchant may wish for confirmation from the host that the request has been received, even if the host does not approve or decline (deny) the request at that time. In such cases, the confirmation message might merely confirm that the adjustment request has been received, rather than providing an ultimate status of the disposition of the request. (Prior to confirming receipt of the transaction, however, the host may perform some preliminary evaluation of the request, such as confirming that the transaction record exists and/or can be identified at the host system, confirming that the transaction record is associated with the merchant that submitted the adjustment request—and/or a related merchant—that the requested adjustment amount does not exceed the original transaction amount, etc.) In such cases, a later confirmation of the ultimate status of the adjustment request may be provided, as described below.

In other embodiments, however, the evaluation of the request might be performed in real time, such that the confirmation message might provide an ultimate status of the request (e.g., by indicating to the POE device that the debit transaction has been adjusted, or that the request has been denied). For instance, the message might include data to the effect that the adjustment request has been approved, and/or a confirmation code (which might also might be stored in the database for later reference, perhaps as part of the transaction record itself). In such cases, this confirmation message may not be transmitted until after the request has been evaluated, as described below.

In some embodiments, upon receiving the confirmation message (block 280), the POE device 285 displays a confirmation to the merchant and/or customer, to provide feedback indicating the status of request. The displayed confirmation might be as simple as the display of a text string such as "OK" (which might indicate that the request has been received), "APPROVED," "AUTHORIZED," "REQUEST APPROVED," (any of which might indicate that the request has been evaluated and approved) and/or the like; the display might also include a confirmation code received from the host computer (if applicable).

In a set of embodiments, as noted above, various embodiments of the invention can include several security features. Merely by way of example, in certain embodiments, the host computer 200 will search a database for any collection records corresponding to the debit transaction (block 250). In some cases, this process may be performed in real time, while in other cases, the search for collection records may be performed as a back-end process. The existence of a collection record corresponding to a debit transaction generally will indicate that the debit amount (i.e., the amount of the check) has not been collected from the account on which the check is drawn; in other words, that the check processor has been unable to secure payment of the check (for non-sufficient funds, because of a stop payment order, etc.).

In such a situation, no credit should be applied against the debit transaction, since the original outstanding balance has not yet been paid. Accordingly, the method 200 includes determining whether a collection record corresponds to the debit transaction (block 255); if so, the adjustment request may be denied (block 260). Alternatively, the adjustment request might not be denied in this case; instead, the adjustment may be processed, but instead of crediting the customer's account (as described below), the credit amount might be applied to reduce an outstanding unpaid amount owed by the customer, with a corresponding reduction in the amount reflected by the collection record; any difference between the adjustment amount and the outstanding unpaid amount might be credited to the customer in the fashion described below. Hence, in such embodiments, if a collection record exists, the merchant's account is debited by the adjustment amount and the collection record is updated accordingly, but no credit is applied to the customer's account (or a reduced amount of credit may be applied, if the adjustment amount exceeds the amount remaining to be collected from the customer.) Conversely, if it is determined that no collection record corresponds to the debit transaction, the host computer proceeds with the adjustment transaction.

Another security feature noted above is the ability to prevent the customer from obtaining a refund greater than the original amount of the check. Hence, in some embodiments, the method 200 comprises comparing the request with the transaction record to determine whether the credit request exceeds the original debit amount (or, alternatively, any remaining debit amount, as in cases in which a prior credit already has been processed, as described in further detail below) (block 265).

In one aspect, if the credit amount in the adjustment request is greater than the amount of the debit (less any intervening credits), the adjustment should not be processed. Hence, the method 200 may comprise determining whether the credit amount exceeds (is greater than) the outstanding debit amount (that is, the amount of the debit transaction, after subtracting any intervening credits processed against the debit transaction) (block 270). If it is determined that the credit amount exceeds the outstanding debit amount, the requested adjustment is denied (block 260). On the other hand, if it is determined that the credit amount does not exceed the outstanding debit amount, the host computer continues to process the adjustment.

At block 275, the host computer processes a debit transaction against an account (e.g., a deposit account) associated with the merchant, and at block 280, the host computer processes a credit transaction for an account (e.g., a deposit account) associated with the customer, and more particularly in some embodiments, the checking account on which the check was drawn in the original debit transaction. As noted above, the merchant's and/or customer's accounts might be maintained by financial institutions separate from the check processor. Hence, processing the debit and/or credit transactions might comprise processing such transactions via an ACH, e.g., by transmitting appropriate data and/or messages (generally referred to herein credit communications and debit communications) via the ACH to the merchant's and customer's respective financial institutions. Various techniques that use an ACH to process transactions for depository accounts are well known in the art, and any of such techniques can be used in accordance with various embodiments of the invention. Alternatively, in some cases, the check processor might have a separate arrangement with the customer's financial institution and/or the merchant's financial institution, such that relevant data and/or messages might be exchanged directly between the processor and one or more of the financial institutions.

In some embodiments, the host computer updates the transaction record as a result of the adjustment (block 285). In particular embodiments, the transaction record might be updated to reflect a credit (that is, to indicate that a credit has been applied against the amount of the original debit). For example, the transaction record, as noted above, might include a variable that holds a value corresponding to the original amount of the debit transaction. Updating the transaction record, then, might comprise reducing the value of this variable by the amount of the credit to give the variable an updated value that corresponds to the difference between the original amount of the debit transaction (i.e., the amount of the customer's check) and the amount of credit applied as a result of the adjustment. (It should be noted, of course, that if a prior adjustment had already been applied a credit to the original debit transaction, the value of this variable already would have been reduced by the amount of this credit, and updating the transaction record in this second iteration would comprise reducing the value of the previously-updated variable further as a result of the second credit.) Such embodiments provide one possible way for the host computer to maintain a "running balance" of the amount of the debit, which, as noted above, can allow the processor to guard against fraud by preventing successive adjustments that collectively apply more credit than the original amount of the debit transaction (check).

Optionally, the host computer might provide confirmation to the merchant that the adjustment transaction has been processed (block 290). In embodiments in which evaluation and/or processing of the request is performed in real time, this confirmation might be provided as described above with respect to blocks 230-240. In other embodiments, in which the evaluation and/or processing of the request is not performed in real time (e.g., the request is evaluated and processed as a back-end and/or batch process), notification via the POE device might be unavailable and/or infeasible. In such cases, confirmation may be provided in a periodic report to the merchant, via a written confirmation (e.g., an email message, a letter, etc.), and/or the like. In other cases, the debit to the merchant's account might provide the confirmation that the transaction has been approved and/or processed.

Similarly, in some cases, if the adjustment request is denied (described above with respect to block 245), the transaction record may be updated (block 285), e.g., to indicate that an adjustment request was received and denied, and/or the host might confirm to the merchant that the adjustment request has been denied (block 290).

As noted above, one feature of certain embodiments allows for multiple partial adjustments (so long, in most cases, as the total of all of the partial adjustments does not exceed the amount of the original check). Hence, as indicated by FIG. 2, the method 200 can be reiterated for successive requests. As noted above, the transaction record for the original debit transaction may be updated with each adjustment transaction, in order to prevent multiple partial credits from exceeding the amount of the check.

Numerous variations on this process are possible within the scope of the invention. Merely by way of example, as noted above, one security feature of some embodiments is to deny an adjustment request when the adjustment amount is greater than the original debit amount. In some embodiments, however, the host may be configured to allow the merchant to provide more credit (an "overflow credit") back to the customer than the original debit amount (for any of a variety of reasons). For example, if the original debit transaction had an amount of $50, the merchant might wish to provide a credit of $100 to the customer via an adjustment. (In some cases, there may be a limit on such "overflow credits," in order to protect the merchant from mistakes and/or fraud—for example, while the merchant, in the example above, might be able to provide a credit of $100, the host computer might refuse a request to provide a credit of $1000.) If the host computer is configured to allow such adjustments, the host computer might adjust the transaction record to reflect a full credit to the customer's account (as described below) and also apply an additional credit to the customer's account, for the difference between the adjustment amount and the original debit amount. This additional credit can be applied in a variety of ways; in an exemplary embodiments, the host computer might apply the additional credit by processing a credit transaction (e.g., via an ACH transaction, PPD transaction, CCD transaction, and/or the like). In some cases, this additional credit can be applied in the same manner as the adjustment to the debit transaction (e.g., as a consolidated credit to the customer's account).

If the merchant is allowed to provide more credit back than the original debit amount, the host may be configured to obtain from the merchant additional funds to fund the additional credit. In some cases, these funds may be obtained by debiting the merchant's account (in the manner described above), either by increasing the amount debited as a result of the adjustment or as an additional debit transaction. In other cases, the merchant might provide details of another account to be debited, the merchant might be billed for the additional amount, and/or the like.

Similarly, in some embodiments, the merchant might be given the ability to request a credit via the adjustment process even if there is no underlying debit transaction to be debited. In such cases, the process might be similar, except that there is no transaction record against which the credit is applied.

Another possible variation is that the original transaction between the merchant and the customer might be a credit transaction, rather than a debit transaction. In other words, the original transaction might be applying a charge against a customer's credit account, rather than debiting the customer's deposit account. In such cases, the adjustment transaction would result in a debit against the credit account, rather than a credit to the deposit account.

Figure 3:
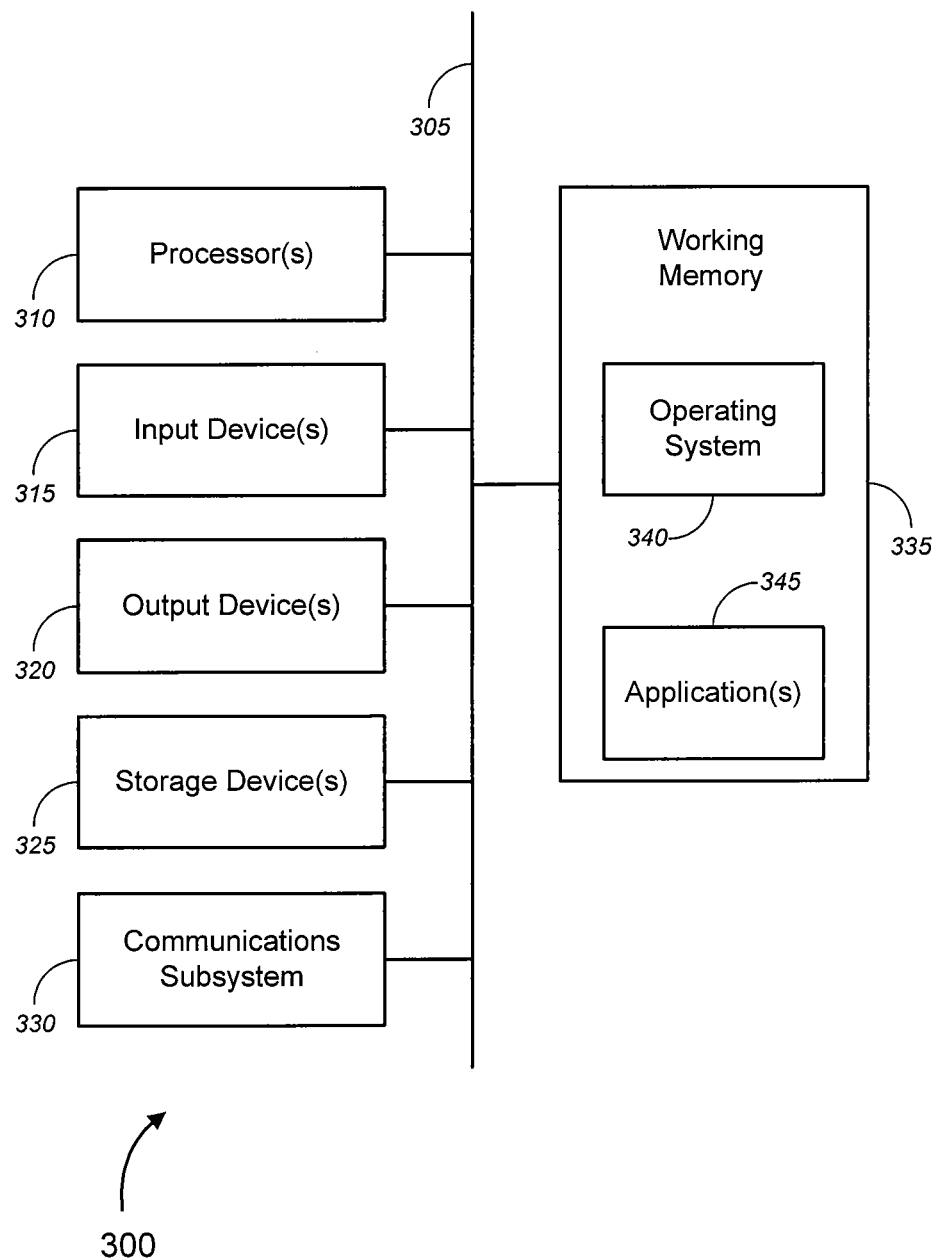
FIG. 3 is a generalized schematic diagram illustrating a computer system, in accordance with various embodiments of the invention.

FIG. 3 provides a schematic illustration of one embodiment of a computer system 300 that can perform the methods of the invention, as described herein, and/or can function as a server computer, a host computer, a user computer, a POE device, and/or the like. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements can include one or more processors 310, including without limitation one or more general-purpose processors and/or one or more special-purpose processors (such as digital signal processing chips, encryption chips, graphics acceleration chips, and/or the like). The hardware elements might also include one or more input devices 315, which can include without limitation a mouse, a keyboard, numeric keypad, and/or the like. In some cases, input devices can include devices for reading and/or scanning financial instruments, such as magnetic ink character recognition ("MICR") scanners, bar code scanners, magnetic stripe readers, etc. The hardware elements might also include one or more output devices 320, which can include without limitation a display device, a printer and/or the like.

The computer system 300 may further include (and/or be in communication with) one or more storage devices 325, which can comprise, without limitation, local and/or network acces- sible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 300 might also include a communications subsystem 330, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 330 may permit data to be exchanged with a network (such as the network described below, to name one example), and/or any other devices described herein, including, by way of specific example, one or more host computers, POE devices, etc. In many embodiments, the computer system 300 will further comprise a working memory 335, which can include a RAM or ROM device, as described above.

The computer system 300 also may include software elements (illustrated as being currently located within the working memory 335), including an operating system 340 and/or other code, such as one or more application programs 345, which may comprise computer programs of the invention, and/or may be designed to implement methods of the invention and/or configure systems of the invention, as described herein. Merely by way of example, one or more procedures and/or operations described with respect to the method(s) discussed above might be implemented as code and/or instructions executable by a computer (and/or a processor within a computer) to perform the procedures/operations. A set of these instructions and/or code might be stored on a computer readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 300) to perform methods of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335, to perform one or more operations in accordance with the invention. Such instructions may be read into the working memory 335 from another machine-readable medium, such as one or more of the storage device(s) 325. Merely by way of example, execution of the sequences of instructions contained in the working memory 335 might cause the processor(s) 310 to perform one or more procedures of the methods described herein. Hence, in an aspect, such instructions are used to configure a computer system to perform specific operations, in accordance with the instructions.

The terms "machine readable medium" and "computer readable medium," as used herein, refer to any medium that participates in providing data that causes a machine to operate in a specific fashion. In an embodiment implemented using the computer system 300, various machine-readable media might be involved in providing instructions/code to processor(s) 310 for execution and/or might be used to store and/or carry such instructions/code (e.g., as signals). In many implementations, a computer readable medium is a physical and/or tangible medium. Such a medium may take many forms, including but not limited to, non-volatile storage media, volatile storage media, and transmission media. Non-volatile media includes, for example, solid state storage devices (e.g., flash memory), optical or magnetic disks, such as the storage device(s) 325. Volatile media includes, without limitation dynamic memory, such as the working memory 335. Transmission media includes, without limitation, coaxial cables, copper wire and fiber optics, including the wires that comprise the bus 305, as well as the various components of the communication subsystem 330 (and/or the media by which the communications subsystem 330 provides communication with other devices). In some cases, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
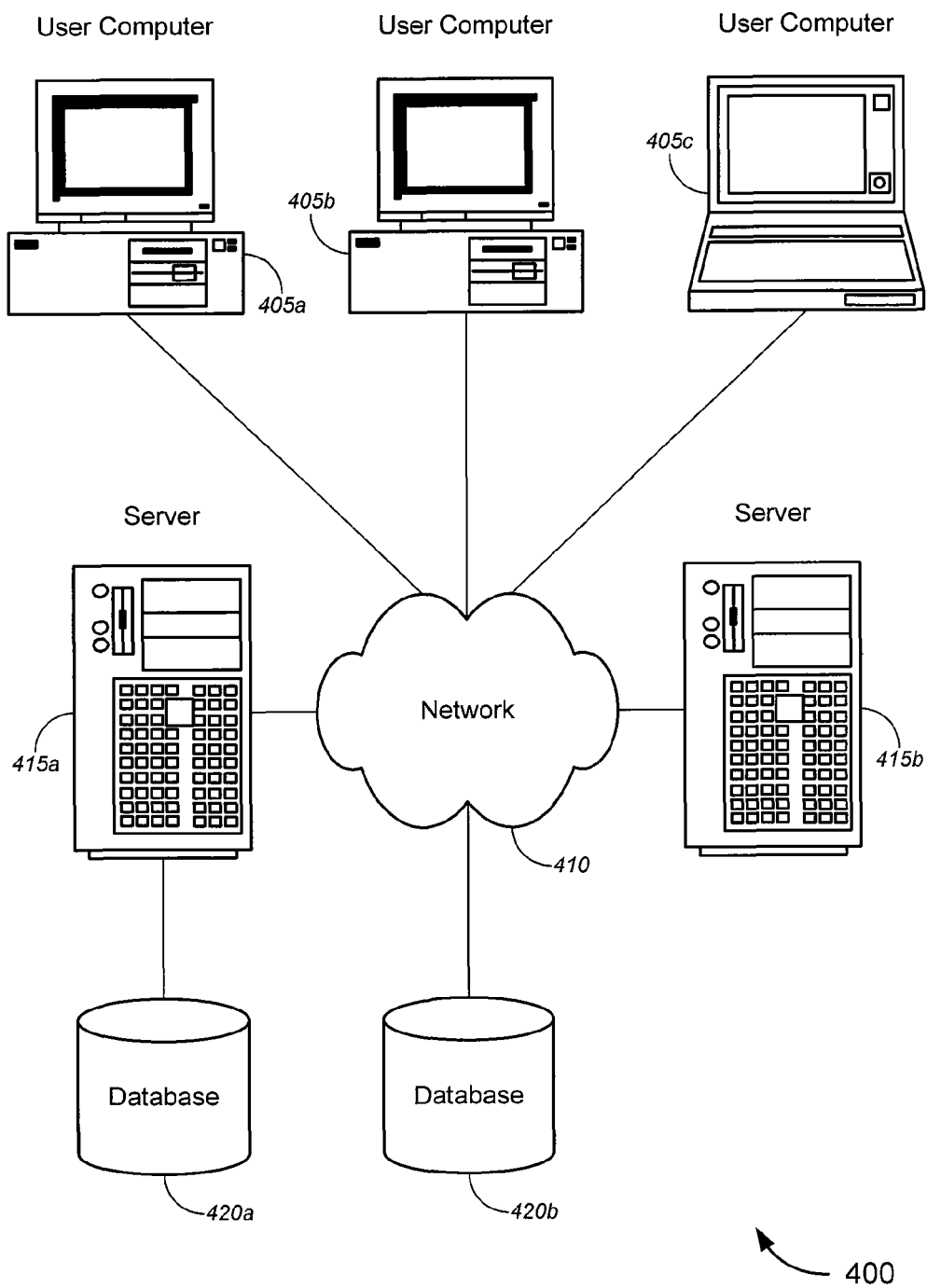
FIG. 4 is a block diagram illustrating a networked system of computers, which can be used in accordance with various embodiments of the invention.

A set of embodiments comprises systems for adjusting a debit transaction, such as the system 100 described above with respect to FIG. 1. While FIG. 1 illustrates a functional arrangement of one such system in accordance with some embodiments, FIG. 4 depicts a schematic diagram of one possible architectural arrangement for a system 400 that can be used in accordance with one set of embodiments. The system 400 can include one or more user computers 405, which, in an aspect, can function as POE devices of the invention. The user computers 405 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 405 can also have any of a variety of applications, including one or more applications configured to perform methods of the invention, as well as one or more office applications, database client and/or server applications, and web browser applications. Alternatively, the user computers 405 can be any other electronic device, such as a thin-client computer or Internet-enabled mobile device (e.g., mobile telephone and/or personal digital assistant), capable of communicating via a network (e.g., the network 410 described below) and/or displaying and navigating web pages or other types of electronic documents. Although the exemplary system 400 is shown with three user computers 405, any number of user computers can be supported.

In an aspect, a user computer 405 might be a point of sale device, which might comprise an embedded operating system, application software and/or firmware for performing methods of the invention (and/or aspects thereof). One skilled in the art can appreciate that a variety of point of sale devices, comprising either specialized and/or general purpose hardware, operating systems, etc., can be used for communicating with one or more host computers. Merely by way of example, in addition to (or in the alternative to) the components described above with respect to FIG. 3, a point of sale device (or any other POE device, for that matter) might comprise specialized hardware and/or software for scanning and/or reading financial instruments, such as checks, credit cards, debit cards and/or the like, including without limitation MICR scanners, bar code scanners, magnetic stripe readers, etc.

Certain embodiments of the invention operate in a networked environment, which can include a network 410. The network 410 can be any type of network familiar to those skilled in the art that can support data communications using any of a variety of freely-distributable, commercially-available, and/or proprietary protocols, including without limitation TCP/IP, SNA, IPX, AppleTalk, and the like. Merely by way of example, the network 410 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 415. Each of the server computers 415 may be configured with an operating system, including without limitation any of those discussed above, as well as any commercially (or freely) available server operating systems. Each of the servers 415 may also be running one or more applications, which can be configured to provide services to one or more clients 405 and/or other servers 415.

Merely by way of example, in a set of embodiments, one or more servers 415 might individually and/or collectively comprise a host computer, as described functionally above. The host computer might comprise one or more mainframe computers, minicomputers, PC servers and/or the like running an appropriate operating system (including without limitation any of the mainframe and/or minicomputer operating systems available from IBM, Data General, Amdahl, etc., any of a variety of UNIX or UNIX-like operating systems, etc.). In an aspect, as noted above, a host computer might comprise appropriate software for communicating with POE devices, other host computers, for communicating with an ACH, etc. Additionally, the host computer might comprise transaction processing software and/or might be capable of processing a large volume of financial transactions (using an ACH or otherwise), as known to those skilled in the art. Further, the host computer generally will comprise software for adjusting debit transactions in accordance with embodiments of the invention.

In some embodiments, one of the servers 415 may be a web server, which can be used, merely by way of example, to process requests for web pages or other electronic documents from user computers 405. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 405 to perform methods of the invention.

The server computers 415, in some embodiments, might include one ore more file and/or application servers, which can include one or more applications accessible by a POE device, a client running on one or more of the client computers 405, and/or other servers 415. Merely by way of example, the server(s) 415 can be one or more general purpose computers capable of executing programs or scripts in response to the user computers 405 and/or other servers 415, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages.

The application server(s) can also include database servers, including without limitation those commercially available from Oracle, Microsoft, Sybase™, IBM™ and the like, which can process requests from clients (including, depending on the configuration, database clients, API clients, web browsers, etc.) running on a user computer 405 and/or another server 415. Data provided by an application server may be formatted as web pages (comprising HTML, Javascript, etc., for example) and/or may be forwarded to a user computer 405 via a web server (as described above, for example). Similarly, a web server might receive web page requests and/or input data from a user computer 405 and/or forward the web page requests and/or input data to an application server. In some cases a web server may be integrated with an application server.

In accordance with further embodiments, one or more servers 415 can function as a file server and/or can include one or more of the files (e.g., application code, data files, etc.) necessary to implement methods of the invention incorporated by an application running on a user computer 405 and/or another server 415. Alternatively, as those skilled in the art will appreciate, a file server can include all necessary files, allowing such an application to be invoked remotely by a user computer 405 and/or server 415. It should be noted that the functions described with respect to various servers herein (e.g., application server, database server, web server, file server, etc.) can be performed by a single server and/or a plurality of specialized servers, depending on implementation-specific needs and parameters.

As noted above, in certain embodiments, systems of the invention can include one or more databases 420. The location of the database(s) 420 is discretionary: merely by way of example, a database 420a might reside on a storage medium local to (and/or resident in) a server 415a (and/or a user computer 405). Alternatively, a database 420b can be remote from any or all of the computers 405, 415, so long as it can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 435 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of adjusting a debit transaction between a merchant and a customer, in response to a request from the merchant, the method comprising:

processing, with a computer system, a debit transaction between the customer and the merchant, the debit transaction pertaining to a personal or business check payable in a debit amount from an account held by the customer and a merchant account associated with the merchant;

creating, in a database, a transaction record corresponding to the debit transaction, the transaction record comprising a variable having a value corresponding to the debit amount;

receiving, at the computer system and from a point of entry device, a request from the merchant to adjust the debit transaction by a credit amount while payment of the personal or business check is pending, the credit amount representing a credit against the debit transaction;

identifying the transaction record at the computer system;

transmitting a confirmation message for reception by the point of entry device, the confirmation message indicating that the request from the merchant has been received;

comparing the request with the transaction record to determine that the credit amount is not greater than the debit amount;

processing a second debit transaction while payment of the personal or business check is pending, in the credit amount, against the merchant account;

processing a credit transaction, while payment of the personal or business check is pending, in the credit amount, for the customer account; and updating the transaction record while payment of the personal or business check is pending to reflect an adjustment against the debit transaction by the credit amount to reduce the debit amount owed for the debit transaction, wherein updating the transaction record comprises reducing the value of the variable by the credit amount, such that the variable has an updated non-zero value corresponding to the difference between the debit amount and the credit amount.

2. A method of adjusting a debit transaction between a merchant and a customer, in response to a request from the merchant, the method comprising:

processing, with a computer system, a debit transaction between the customer and the merchant, the debit transaction pertaining to a personal or business check payable in a debit amount from an account held by the customer and a merchant account associated with the merchant;

creating a transaction record corresponding to the debit transaction, the transaction record comprising a variable having a value corresponding to the debit amount;

receiving, at the computer system and from a merchant device, a request from the merchant to adjust the debit transaction by a credit amount while payment of the personal or business check is pending, the credit amount representing a credit against the debit transaction;

identifying the transaction record at the computer system while payment of the personal or business check is pending;

updating the transaction record while payment of the personal or business check is to reflect an adjustment against the debit transaction to reduce the debit amount owed for the debit transaction, wherein updating the transaction record comprises reducing the value of the variable by the credit amount, such that the variable has an updated non-zero value corresponding to the difference between the debit amount and the credit amount;

processing a second debit transaction while payment of the personal or business check is pending, in the credit amount, against the merchant account; and processing a credit transaction while payment of the personal or business check is pending, in the credit amount, for the customer account.

3. The method of claim 2, further comprising comparing the request with the transaction record to determine whether the credit amount is greater than the debit amount.

4. The method of claim 3, further comprising:

determining that the credit amount is greater than the debit amount;

wherein:

updating the transaction record comprises updating the transaction record to indicate that an adjustment request has been denied.

5. The method of claim 3, further comprising:

determining that the credit amount is greater that the debit amount;

obtaining, from the merchant, additional funds to cover the difference between the credit amount and the debit amount; and applying a credit to the account held by the customer, in an amount of the additional funds;

wherein updating the transaction record comprises updating the transaction record to reflect a credit, against the debit transaction, by the debit amount.

6. The method of claim 5, wherein applying a credit to the account held by the customer comprises processing a second credit transaction to credit the account held by the customer.

7. The method of claim 6, wherein the credit transaction is selected from the group consisting of an automated clearinghouse ("ACH") transaction, a cash concentration or disbursement ("CCD") transaction, and a prearranged payment and deposit ("PPD") transaction.

8. The method of claim 3, further comprising:

determining that the credit amount is not greater than the debit amount; and processing the second debit transaction, in the credit amount, against the merchant account.

9. The method of claim 2, further comprising:

receiving, at the computer system and from a second point of entry device, a request from the merchant to adjust the debit transaction by a second credit amount representing a second credit against the debit transaction;

comparing the request with the updated transaction record to determine that the second credit amount is not greater than the updated value of the variable;

processing a third debit transaction, in the second credit amount, against the merchant account; and updating the transaction record a second time to reflect a second adjustment against the debit transaction by the second credit amount, wherein updating the transaction record a second time comprises reducing the value of the variable by the second credit amount, such that the variable has a second updated value corresponding to the difference between the updated value and the second credit amount.

10. The method of claim 9, wherein the second point of entry device and the first point of entry device are not the same point of entry device.

11. The method of claim 2, further comprising confirming to the merchant that the debit transaction has been adjusted.

12. The method of claim 2, wherein processing a debit transaction between the customer and the merchant comprises:
    transmitting, to a first financial institution having a first deposit account associated with the financial instrument, a debit communication; and
    transmitting, to a second financial institution having a second deposit account associated with the merchant, a credit communication.

13. The method of claim 12, wherein the credit and debit communications are transmitted via an automated clearinghouse ("ACH").

14. The method of claim 2, further comprising:
    searching the database for a collection record corresponding to the debit transaction, wherein the collection record indicates that the debit amount has not been collected.

15. The method of claim 14, further comprising:
    determining that a collection record corresponds to the debit transaction, the collection record comprising a collection amount that has not been paid by the customer; and
    reducing the collection amount by the credit amount;
    wherein:
        updating the transaction record comprises updating the transaction record to indicate that the credit amount has been applied against the collection record.

16. The method of claim 14, further comprising:
    determining that no collection record corresponds to the debit transaction;
    wherein:
        updating the transaction record comprises updating the transaction record to reflect a credit, against the debit transaction, by the first amount.

17. A computer system for adjusting a debit transaction between a merchant and a customer, the computer system comprising:
    a processor;
    a communication interface in communication with the processor;
    a database in communication with the processor; and
    a computer readable medium in communication with the processor, the computer readable medium having encoded thereon a computer program comprising a set of instructions executable by the processor to cause the computer system to perform one or more operations, the set of instructions comprising:
    instructions for processing a debit transaction between the customer and the merchant, the debit transaction pertaining to a personal or business check payable in a debit amount from an account held by the customer and a merchant account associated with the merchant;
    instructions for creating, in the database, a transaction record corresponding to the debit transaction, the transaction record comprising a first value corresponding to the debit amount;
    instructions for receiving, from a point of entry device, a request from the merchant to adjust the debit transaction by a credit amount while payment of the personal or business check is pending, the credit amount representing a credit against the debit transaction;
    instructions for identifying the transaction record at the computer system while payment of the personal or business check is pending;
    instructions for transmitting a confirmation message for reception by the point of entry device while payment of the personal or business check is pending;
    instructions for updating the transaction record while payment of the personal or business check is pending to reflect an adjustment against the debit transaction by the credit amount to reduce the debit amount owed for the debit transaction,
    wherein updating the transaction record comprises reducing the first value to a second non-zero value corresponding to the difference between the debit amount and the credit amount;
    instructions for processing a second debit transaction while payment of the personal or business check is pending in the credit amount against the merchant account; and
    instructions for processing a credit transaction while payment of the personal or business check is pending in the credit amount, for the customer account.

18. A system for adjusting a debit transaction between a merchant and a customer, the system comprising:
    a first point of entry device, comprising:
        a first processor;
        a first communication interface in communication with the processor; and
        a first computer readable medium in communication with the first processor, the first computer readable medium having encoded thereon a first computer program comprising a first set of instructions executable by the first processor to cause the first point of entry device to perform one or more operations, the first set of instructions comprising:
        instructions for receiving, from a merchant, a request to adjust a debit transaction by a credit amount while payment of a personal or business check is pending, the credit amount representing a credit against the debit transaction;
        instructions for transmitting the request for reception by a host computer system; and
        instructions for displaying confirmation of a status of the request, based on receipt of a confirmation message from the host computer system; and
    the host computer system, comprising:
        a second processor;
        a second communication in, efface in communication with the second processor, for
        providing communication with the first point of entry device;
        a database in communication with the second processor; and
        a second computer readable medium in communication with the second processor, the second computer readable medium having encoded thereon a second computer program comprising a second set of instructions executable by the second processor to cause the computer system to perform one or more operations, the second set of instructions comprising:
        instructions for processing the debit transaction between the customer and the merchant, the debit transaction pertaining to the personal or business check payable in a debit amount from an account held by the customer and a merchant account associated with the merchant;
        instructions for creating, in the database, a transaction record while payment of the personal or business check is pending corresponding to the debit transaction, the transaction record comprising a first value corresponding to the debit amount;
        instructions for receiving, from the first point of entry device, the request from the merchant while payment of the personal or business check is pending;

instructions for identifying the transaction record at the computer system while payment of the personal or business check is pending;

instructions for transmitting a confirmation message for reception by the point of entry device;

instructions for updating the transaction record while payment of the personal or business check is pending to reflect an adjustment against the debit transaction by the credit amount to reduce the debit amount owed for the debit transaction, wherein updating the transaction record comprises reducing the first value to a second non-zero value corresponding to the difference between the debit amount and the credit amount;

instructions for processing a second debit transaction while payment of the personal or business check is pending in the credit amount, against the merchant account; and instructions for processing a credit transaction while payment of the personal or business check is pending in the credit amount for the customer account.

19. A non-transitory computer readable medium having encoded thereon a computer program comprising a set of instructions that are executable by a computer system to perform one or more operations, the set of instructions comprising:

instructions for processing a debit transaction between the customer and the merchant, the debit transaction pertaining to a personal or business check payable in a debit amount from an account held by the customer and a merchant account associated with the merchant;

instructions for creating, in a database, a transaction record corresponding to the debit transaction, the transaction record comprising a first value corresponding to the debit amount;

instructions for receiving, from a point of entry device, a request from the merchant, to adjust the debit transaction by a credit amount while payment of the personal or business check is pending, the credit amol.mt representing a credit against the debit transaction;

instructions for identifying the transaction record at the computer system;

instructions for updating the transaction record while payment of the personal or business check is pending to reflect an adjustment against the debit transaction by the credit amount to reduce the debit amount owed for the debit transaction, wherein updating the transaction record comprises reducing the first value to a second non-zero value corresponding to the difference between the debit amount and the credit amount;

instructions for processing a second debit transaction while payment of the personal or business check is pending, in the credit amount, against the merchant account;

instructions for processing a credit transaction while payment of the personal or business cheek is pending in the credit amount, for the customer account;

and instructions for transmitting a confirmation message to the point of entry device.

* * * * *